No. 784,819. PATENTED MAR. 14, 1905.
H. WELCH.
SHOCKER FOR GRAIN BINDERS.
APPLICATION FILED APR. 9, 1903.

5 SHEETS—SHEET 1.

Witnesses
Inventor
Herman Welch
Attorneys

No. 784,819. PATENTED MAR. 14, 1905.
H. WELCH.
SHOCKER FOR GRAIN BINDERS.
APPLICATION FILED APR. 9, 1903.

5 SHEETS—SHEET 3.

Witnesses
Inventor
Herman Welch,
By Mason, Fenwick & Lawrence
Attorneys

No. 784,819. PATENTED MAR. 14, 1905.
H. WELCH.
SHOCKER FOR GRAIN BINDERS.
APPLICATION FILED APR. 9, 1903.
5 SHEETS—SHEET 4.
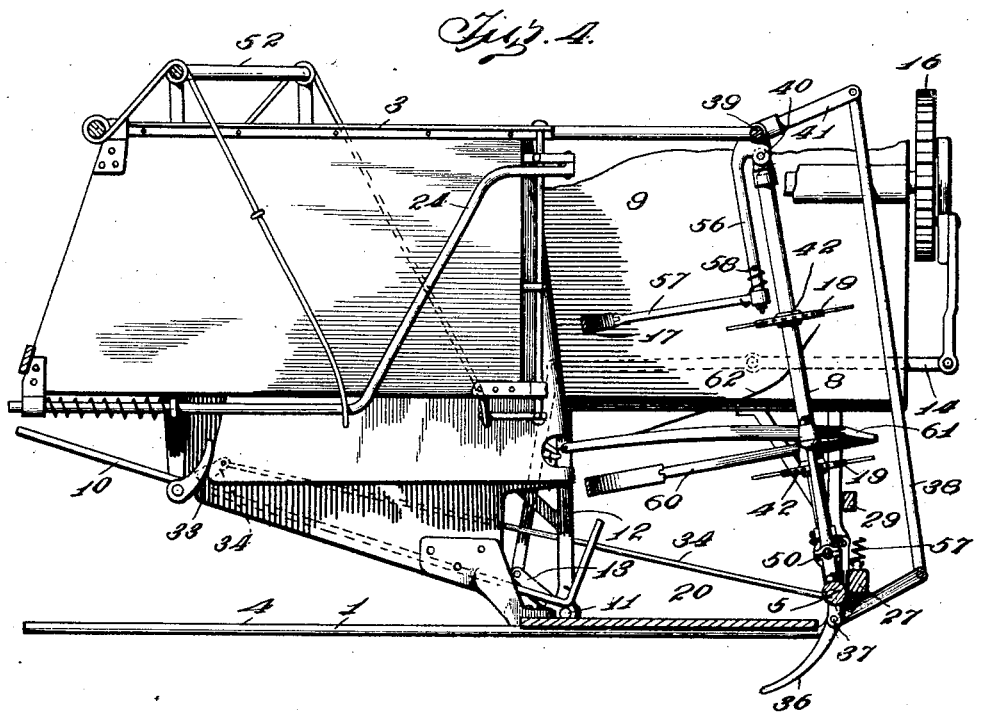
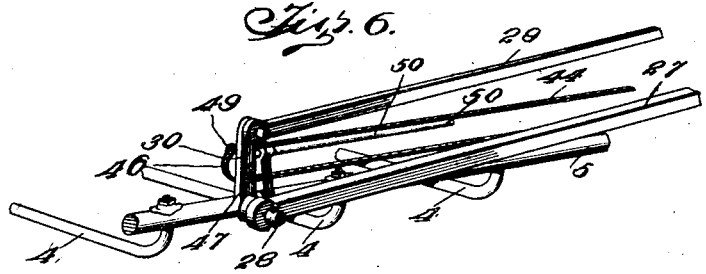

No. 784,819. PATENTED MAR. 14, 1905.
H. WELCH.
SHOCKER FOR GRAIN BINDERS.
APPLICATION FILED APR. 9, 1903.
5 SHEETS—SHEET 5.
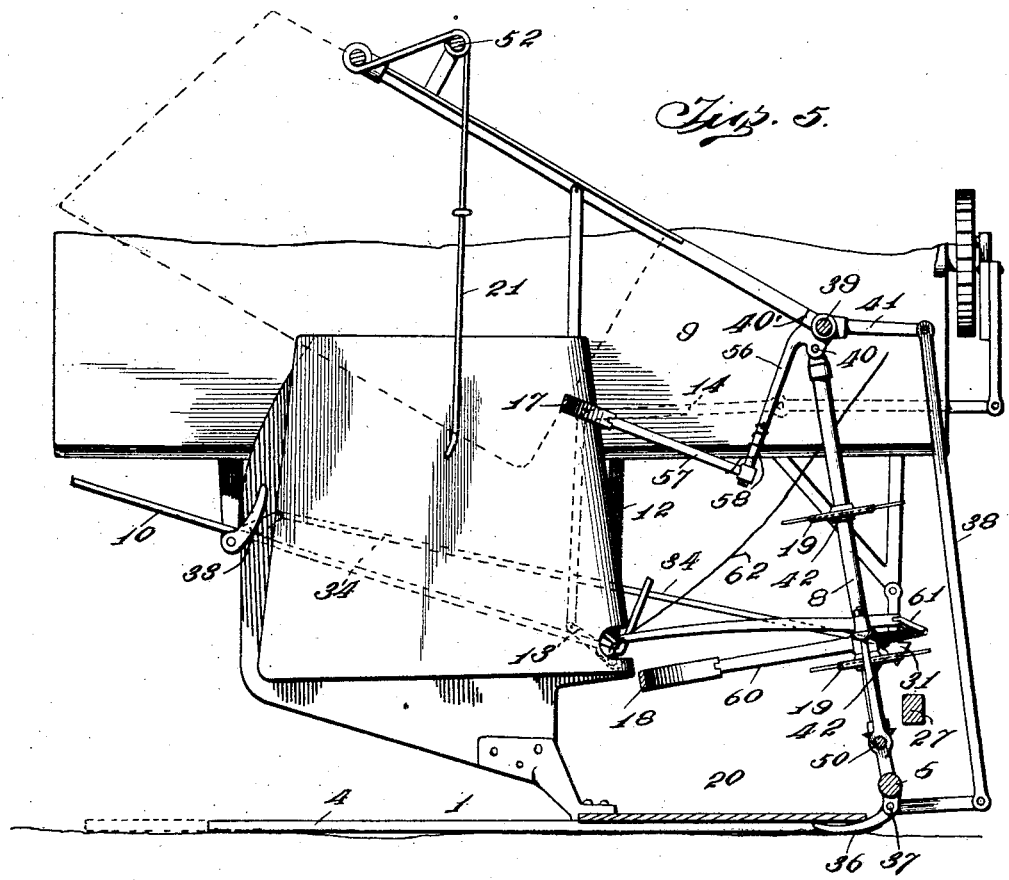
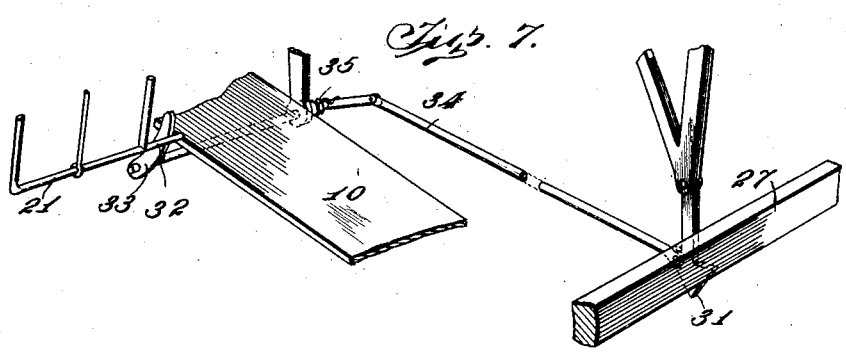

No. 784,819.

Patented March 14, 1905.

UNITED STATES PATENT OFFICE.

HERMAN WELCH, OF ADDINGTON, INDIAN TERRITORY.

SHOCKER FOR GRAIN-BINDERS.

SPECIFICATION forming part of Letters Patent No. 784,819, dated March 14, 1905.

Application filed April 9, 1903. Serial No. 151,925.

*To all whom it may concern:*

Be it known that I, HERMAN WELCH, a citizen of the United States, residing at Addington, Chickasaw Nation, Indian Territory, have invented certain new and useful Improvements in Shockers for Grain-Binders; and I do hereby declare the following to be a full, clear, and exact description of the invention, such as will enable others skilled in the art to which it appertains to make and use the same.

My invention relates to improvements in harvesting mechanism, and particularly to automatically-acting shocking attachments for grain-binders.

The object of my invention is to provide a simple, effective, and practical means for forming bundles into shocks before ejection from the binder.

A further object is to provide such a device as will produce a perfect shock in the most approved manner, the device to be attached to a binder and operated by mechanism thereon.

With these and other objects in view my invention comprises a suitable framework divided into stalls for the reception of the bundles, means for tying the bundles into shocks, and means for ejecting said shocks from the said framework.

It comprises, further, in combination with mechanism specified, means for receiving the bundles from the binder and placing them in proper relative position for delivery to their respective stalls.

It further comprises certain other novel constructions, combinations, and arrangements of parts, as will be hereinafter fully described and claimed.

Figure 1:
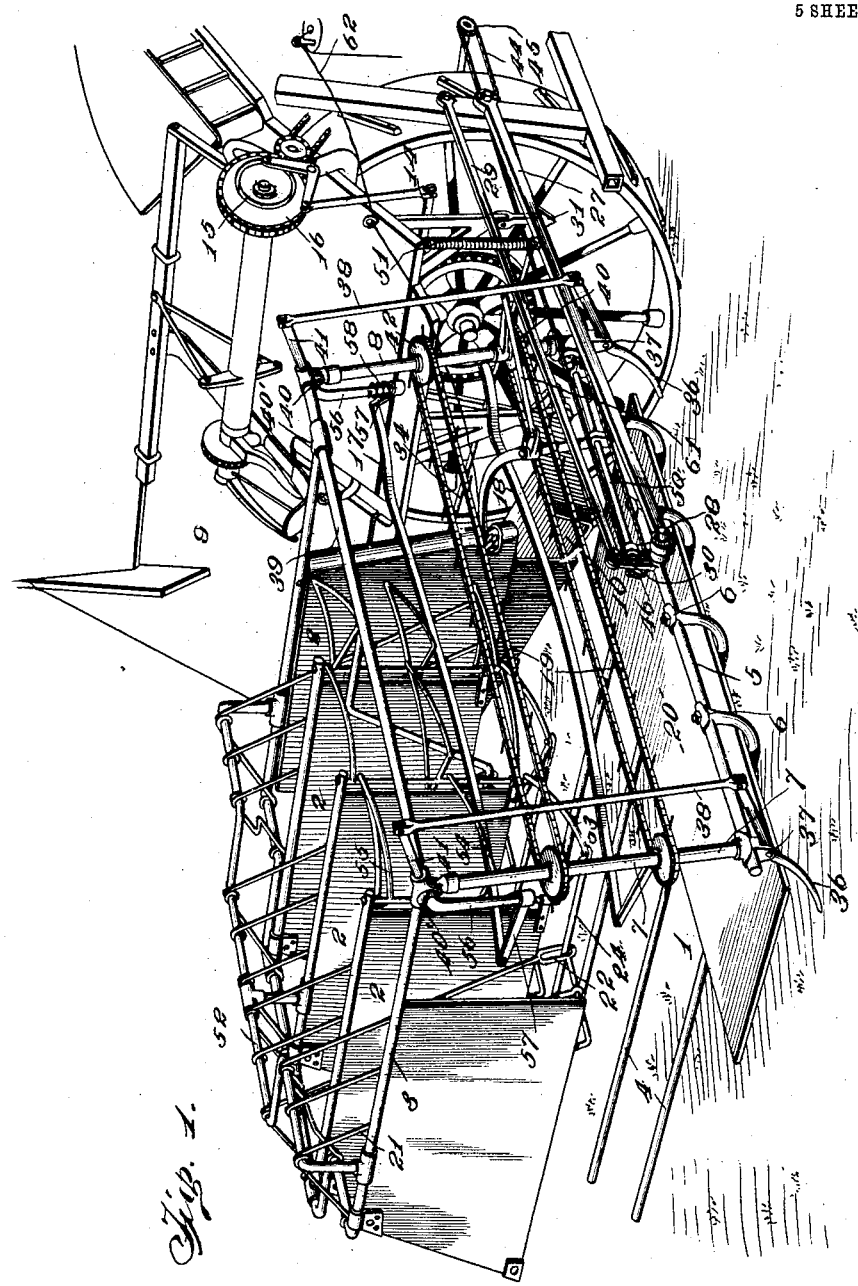
Figure 2:
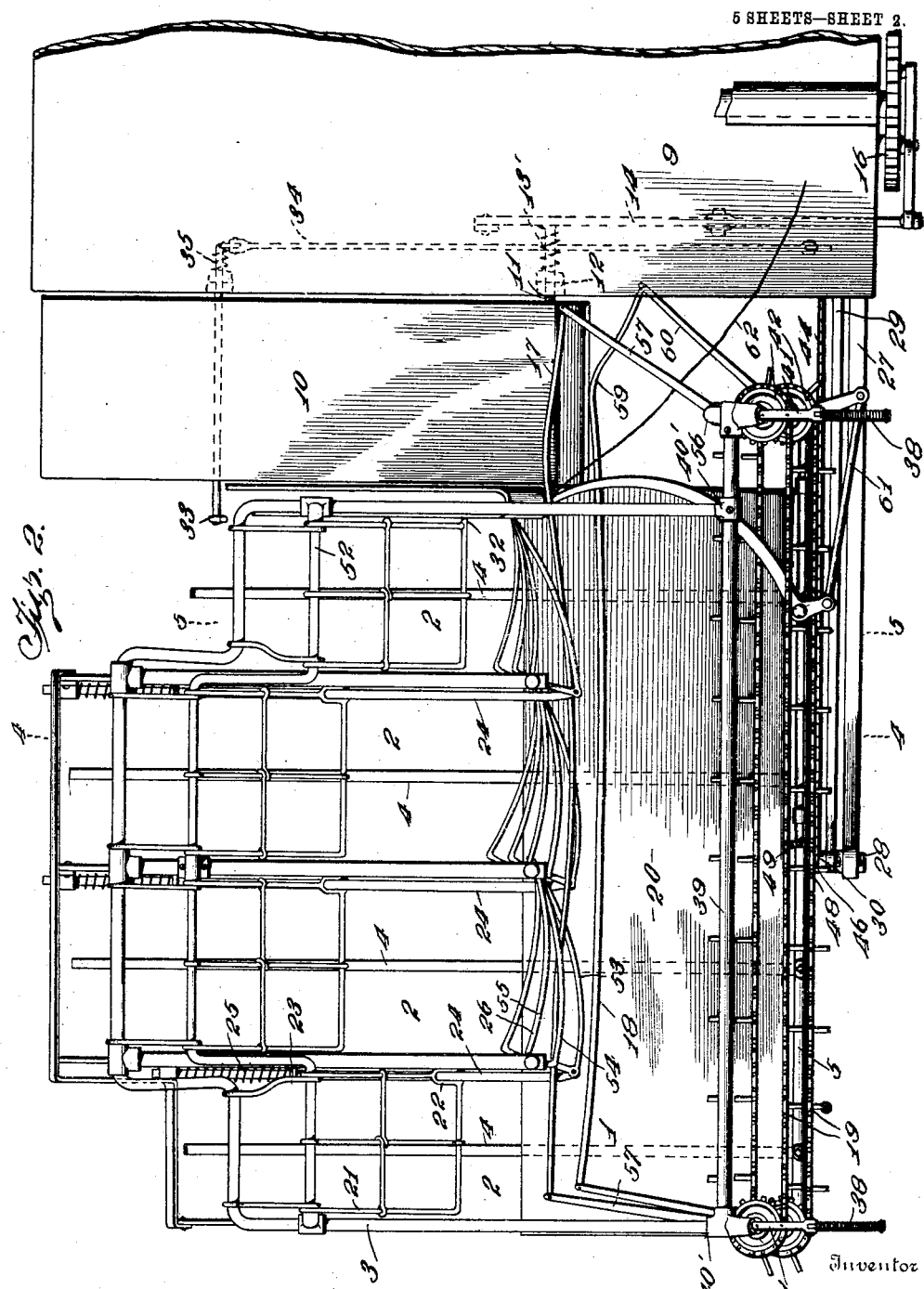
Figure 3:
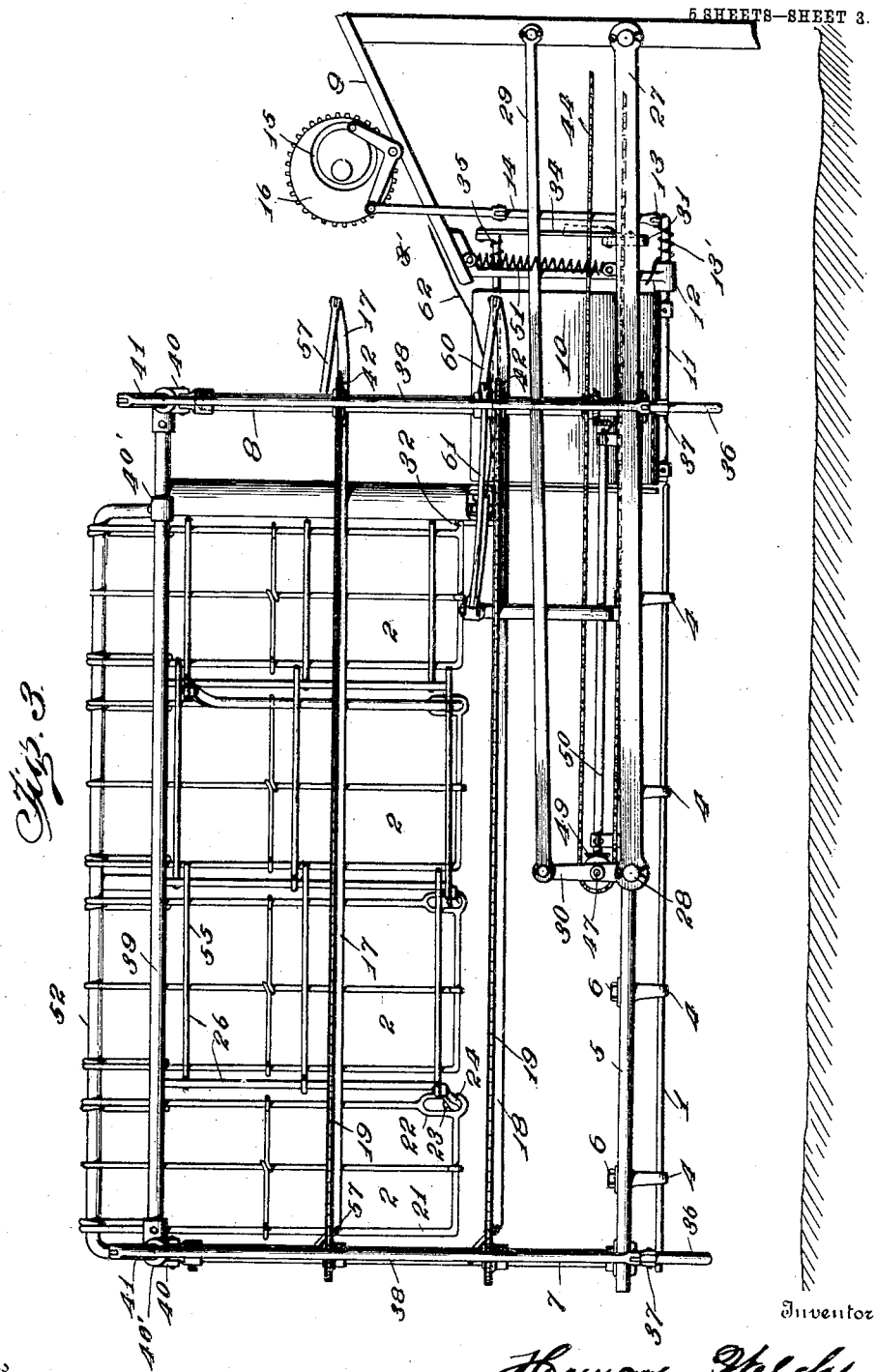

In the drawings, Figure 1 is a perspective view of my device, showing a portion of a common form of binder to which the same can be applied. Fig. 2 is a top plan view of the same. Fig. 3 is a side elevation of the same. Fig. 4 is a sectional view taken on the line 4 4 of Fig. 2. Fig. 5 is a similar view taken on the plane on line 5 5, Fig. 2, showing the relative position of parts when the shocker is in a position to discharge a shock. Figs. 6 and 7 represent enlarged detail fragmentary views of the supporting-shaft and surrounding parts.

Like reference-numerals refer to the like parts throughout the several views.

1 represents the floor of the device. 2 represents suitable bundle-receiving stalls, and 3 represents a framework for supporting the same.

The floor 1 is composed of rearwardly-extending bars 4 4, bending upwardly at their forward ends, and securely fastened to the main bar 5 of the device, as at 6 6. From the ends of the main bar 5 rise standards 7 and 8, which support the upper framework and stalls.

Immediately below the edge of the binder-platform 9 I provide a suitable cradle, as 10, to receive the bundles as they are delivered from the platform. The cradle 10 is in the form of a flat piece of sheet-iron or other suitable material and position, as best seen in Fig. 4 of the drawings, its lower end being bent upwardly at substantially a right angle. At its angle it is fixed to the shaft 11, extending beneath the same and supported by a suitable brace 12, depending from the under side of the binder-platform. The shaft extends beyond the bearing in the support and is formed at its end with a suitable crank 13, which engages a train of levers, as 14, operated by a cam 15, formed in the outer face of the gear 16 on the top of the binder-platform, the said gear being the same which operates the ordinary knotter in the formation of the bundles before the same leave the binder. A coil-spring, as 13', encircles the extended portion of shaft 11 and is so positioned as to counterbalance the weight of the longer end of the cradle. It will be noticed from this construction and arrangement that each time a bundle is delivered from the binder-platform down upon the cradle the same means that ejects the bundle from the binder-platform serves to raise the cradle into an upright position and in this way produce a perfectly timed, compact, and simple arrangement. As the cradle in swinging to its upright position sets the bundle upon its end or base, the bundle is caused to press against suitable springs 17 and 18, projecting from suitable supports on the standards 7 and 8. These springs are very important in the proper execution of the work of the shocker and will be fully described hereinafter. As the bundle presses the springs it comes into contact with pins projecting from moving chains, as 19 19, and is forced thereby down the aisle 20, being pressed steadily outward by the springs 17 and 18 until it reaches the last stall in the series, which, it will be noticed, has no gate to guard its entrance, when the springs will force it into the opening. When another bundle is delivered to the cradle and is made to go through the same process as its predecessor and is delivered to its position in front of the one already stalled, the springs 17 and 18, still exerting their pressure, will force back the rear wall 21 of the stall, and in so doing the loop 22 of the side rod thereof will come into contact with the collar 23 on the rod 24 and forcing it back against the tension of coil-spring 25 will open the gate 26 and leave the entrance to the second stall open to the next bundle from the binder, at the same time closing the aisle past said stall.

As it is preferable to have shocks of grain formed of ten bundles each, I form my device into four stalls, each of the center two being of a size to accommodate three bundles and each of the outside ones to accommodate only two. As the two have already been deposited in the first stall and the gate to the second thrown open, the next three bundles in the line of delivery will be forced by the springs 17 and 18 into the second stall. When this is filled and the gate of the third stall opened in a similar manner as above described, the next three will be delivered to that stall, at the filling of which the gate of the last stall will be thrown open to receive its two bundles. The device now being filled is ready to discharge the entire lot.

As will be noticed from the drawings, the device is suspended above the ground by a suitable shaft 27, the said shaft engaging a stub-shaft 28, projecting from the main rod 5 of the framework at one end, and a similar shaft projecting from the framework of the binder at the other. Both of these stubs are merely pivots. In order to hold the device in its proper relative position and limit the same in its vertical movement, I provide, further, a secondary shaft, as 29, positioned somewhat above the shaft 27, pivoted similarly to the binder and pivoted at the outer end to a standard 30, projecting from the upper face of the main bar 5. In order to hold the shocker at the proper height, I provide a latch, as 31, pivoted to a suitable support on the binder and operated by the projection 32 on the back of the last stall adapted to engage lever 33 through the medium of a crank-and-rod connection 34. A coil-spring 35 is interposed so as to bear upon the crank to hold the latch 31 into proper engagement with the shaft 27 while the shocker is being filled.

As the last shock is deposited in its stall the projection on the back of the said stall engages the lever 33 and, as just described, withdraws the latch from its engagement with the shaft 27, and the weight of the shock supported within the stalls causes the entire framework to drop by gravity to the ground.

In order to facilitate the better discharge of the shock from the stalls, I provide means for raising the stalls above and clear of the shock simultaneous with the downward movement of the shock. The fingers 36 are the first to come into contact with the ground as the shocker lowers. These fingers are formed in the shape of bell-cranks and are pivoted at their center to suitable supports 37 37, depending from the under face of the main rod 5 of the framework. Rods or links 38 are pivotally connected at the outer end of the latch-fingers 36. The upper main rod 39 of the framework is fitted into suitable castings, the said castings forming pivots 40 40, upon which the whole of the upper framework and stalls are pivoted. Projecting from the front of these castings are arms 41 41, engaging at their ends the links or rods 38 38. Projecting rearwardly from the upper shaft 39 and securely fastened thereto, as at 40' 40', is the main framework of the stalls. The construction just described being the sole support of the stalls, it will be readily seen that when the fingers 36 come into contact with the ground the rods 38 38 will be drawn downwardly. The framework pivoting at 40 40 will throw the stalls upwardly into the position shown in Fig. 5 of the drawings.

The upright 8 is rotatably mounted at its ends, one in the casting-engaging pivot 40 and the other upon the main rod 5, and carries suitable sprocket-wheels 42 42, the said wheels being securely fastened thereto and carrying the endless chains 19 19. Opposite loops of these chains engage similar sprockets mounted rotatably upon the upright 7. It will be seen by this construction that the endless chains mounted one above the other extend from end to end of the shocker and along the front side thereof and, as above described, serve to force the bundles after their deliverance from the cradle down the aisle 20 and into their respective stalls. Suitable pins project from these chains to better effect this result. A sprocket-chain, as 44, engaging a sprocket 45 on any convenient shaft in the binder, extends along the front of the shocker and engages the sprocket-wheel 46, mounted in a bearing 47, formed in the upright 30. A bevel-gear, as 48, is mounted upon the same shaft with the sprocket 46 and meshes with a similar bevel-gear 49 at the end of the shaft 50, the said shaft being supported in bearings and carrying at its opposite end a bevel-gear which engages a suitable fellow securely mounted upon the upright 8. Through this train the chains 19 19 are caused to travel through motion received from the mechanism on the binder proper.

In order to eject the shock from the stalls, the floors thereof are composed of the single rods 4 4, being sufficient only to support the same when the shocker is in its raised position and at the same time permitting the butt-end of the stalks to engage the stubble and permit the rods 4 4 to be withdrawn from under them, leaving the shock standing alone and self-supporting upon the ground. A heavy coil-spring, as 51, is interposed between the lower face of the binder-platform and the upper face of the shaft 27 to return the shocker to its original or raised position after the shock has been expelled.

The rear wall of each of the stalls is of a spring-wire construction with the top ends of each of the side pieces coiled around a rod 52, forming a superstructure and supported upon the main framework of the stalls, the other ends of each of the coils thus formed extending downwardly and rearwardly and connecting with the main framework, as clearly shown in the drawings. Thus it will be seen that when the first bundle is deposited into one of the stalls it will bear directly against this spring-wall and partly depress the same, holding the bundle with a yielding spring-pressure, and when the next bundle or bundles is or are deposited in the stalls the back is caused to yield until, as above described, the loop 22 presses back the collar 23 and opens the gate to the next succeeding stall.

In order to properly direct bundles into the first stall, the gate to the second stall has its lower member 53 bent outwardly at its rear end considerably beyond the vertical plane of the middle member 54, while said middle member is correspondingly bent beyond the plane of the upper member 55, the forward end of each of these members being in the same vertical plane. The gates of the remaining stalls are substantially like the gate to the second stall for producing the proper effect upon the bundles directed to the respective stalls.

The castings, provided with pivots 40, are formed at the rear with downwardly-projecting arms 56 56, at the lower end of each of which is pivotally mounted an arm 57, extending at right angles thereto and each carrying at its free end one of the ends of the spring 17. Thus it will be seen that as the stalls are raised the spring 17 will be caused to raise simultaneously to prevent its engagement with the gates of the stalls. A coil-spring 58 is so mounted as to tend to hold the arms 57 57 in their proper position for keeping the spring 17 well out from the standards 7 and 8 and at the same time give greater resiliency to the spring as the bundles press against it.

As will be noted from Fig. 2 of the drawings, the lower spring 18 is of a somewhat different shape from the spring 17, being formed at a point marked 59 with a hump or angle, the spring beyond this hump connecting at its end with the arm 60, which is part of a bell-crank pivoted at its center on the shaft 8, the other extension having pivoted to its end a link 61, which in turn engages a similar arm formed at the pivot end of a needle 43. The arm of the bell-crank being considerably longer than the arm of the needle, it will be seen that a slight movement of the bell-crank will cause the needle to bound around out of the path of the incoming bundle.

The twine 62 is delivered from any suitable source on the binder through the eye of the needle 43 and has its end securely held in a convenient form of knotter, the said knotter being positioned between the wall of the fourth stall and the wall at the side of the cradle. As the needle is thrown back, as just described, the eye thereof will follow along the twine, leaving a stretch of the said twine from the knotter across the path of the incoming bundle and through the eye of the needle. As the bundle is carried down the aisle 20 by the projections on the chains 19 19 it will of course carry the twine along in front of it, the twine being fed from its supply through the eye of the needle. As succeeding bundles are delivered to the binder they are also caused to take their place in the loop formed by the first bundle until when the shocker is filled and the needle returned to its proper position the knotter performs its work and the shock is ready to be discharged. The work of tying a shock in this manner consumes little or no time and is easily performed before the shock is lowered to the ground.

It will be noticed, particularly from Fig. 4 of the drawings, that the walls of the stalls extend downwardly only to a plane about halfway between the upper frame of the stalls and the floor of the shocker. It will be noticed also that the plane of the knotter and needle is somewhat below and clear of the bottom of the stalls. This construction is necessary to permit of the free passage of the twine around the shock. By reason of the peculiar formation required in the construction of the gate to the fourth stall it is found necessary that the rod 24, operating the said gate, should be bent upwardly, so as to connect with the gate at the top member thereof.

Although I have shown and described only one particular embodiment of this invention, still I do not wish to be limited to the exact construction and arrangement of parts shown and described, but shall feel at liberty to deviate therefrom in many of the minor points of the invention.

Having fully described my invention, what I claim as new, and desire to secure by Letters Patent, is—

1. In a shocking attachment for grain-binders, the combination with suitable framework of stalls supported thereby, gates guarding the entrance to each of said stalls, means for automatically closing the entrance of one stall and opening the entrance to another stall when the former stall is filled, and means for discharging the bundles from all of said stalls, substantially as described.

2. In a shocking attachment for grain-binders, the combination with suitable framework of stalls supported thereby, means carried within each of said stalls for automatically closing the entrance thereof, substantially as described.

3. In a shocking attachment for grain-binders, the combination with a suitable framework, stalls pivotally supported on the said framework, means for delivering bundles to the said stalls, and means for raising the said stalls from the bundles, substantially as described.

4. In a shocking attachment for grain-binders, the combination with a suitable floor supported above the ground and a top above the floor, of means for lowering the floor to the ground, fingers pivotally mounted on the bottom side of the floor for engaging the ground, and means operated thereby for raising the said top, substantially as described.

5. In a shocking attachment for grain-binders, the combination with a supporting-frame, of parallel stalls carried thereby, an aisle being formed at right angles to and at one end of the stalls, and means for directing bundles down said aisle and into said stalls, the stalls being arranged along the length of said aisle and all of said stalls opening into the same.

6. In a shocking attachment for grain-binders, the combination with a frame, of a plurality of stalls carried thereby, an aisle being formed at one end of and arranged at right angles to said stalls, means for moving bundles down said aisle, means for forcing bundles into said stalls, and means governing the admission of the bundles to the stalls.

7. In a shocking attachment for grain-binders, the combination with a supporting-frame, of a plurality of stalls carried thereby, a gate closing one of said stalls, means for forcing bundles into the other of said stalls, and means within the last-mentioned stall for opening said gate.

8. In a shocking attachment for grain-binders, the combination with a frame, of a plurality of stalls carried thereby, an aisle being formed transversely of the stalls, means for directing a bundle longitudinally of said aisle, and a spring-arm extending longitudinally of the aisle and designed to exert pressure upon the bundles passed longitudinally of said aisle in a direction toward said stalls.

9. In a shocking attachment for grain-binders, the combination with a frame, of a plurality of stalls carried thereby, an aisle being formed at one side of said frame transversely of the stalls, a spring-arm extending longitudinally of said aisle, and means for directing a bundle longitudinally of the aisle between said spring and said stalls.

10. In a shocking attachment for grain-binders, the combination with a frame, of a plurality of stalls carried thereby, an aisle being formed transversely of said stalls, a spring-arm extending longitudinally of said aisle, means for directing a bundle between said arm and said stalls, and means actuated by said arm for positioning a cord in the path of movement of said bundle.

11. In a shocking attachment for grain-binders, the combination with a frame, of a plurality of stalls carried thereby, an aisle being formed transversely of said stalls, a pivotally-mounted arm at each end of said aisle, a spring connecting said arms, and means for directing a bundle between said spring and said stalls.

12. In a shocking attachment for grain-binders, the combination with a frame, of a plurality of stalls carried thereby, an aisle being formed transversely of said stalls, a lower spring extending longitudinally of said aisle, an upper spring also extending longitudinally of said aisle, and means for directing bundles longitudinally of the aisle between said springs and stalls.

13. In a shocking attachment for grain-binders, the combination with a frame, of a plurality of stalls carried thereby, an aisle being formed transversely of said stalls, a pivotally-mounted cord-carrying needle extending across said aisle, means for directing bundles longitudinally of said aisle, means for directing bundles into said stalls from said aisle, and means for swinging said needle across the aisle in front of each bundle as the same passes down the aisle.

14. In a shocking attachment for grain-binders, the combination with a frame, of a plurality of stalls carried thereby, a floor for said stalls, means for supporting said floor above the ground, releasing means for said support for permitting the floor to descend to the ground, and means carried by said floor for elevating said stalls.

15. In a shocking attachment for grain-binders, the combination with a frame having a plurality of stalls carried thereby, of a floor for said stalls, means supporting said floor above the ground, means for releasing said support for permitting the floor to descend to the ground, and ground-engaging means for elevating said stalls.

16. In a shocking attachment for grain-binders, the combination with a frame, of a plurality of stalls carried thereby, a pivotally-mounted gate for closing one of said stalls, a crank turning with said gate, a shaft pivotally engaging said crank and extending into the other stall, and means adapted to engage said shaft for actuating said gate when the last-mentioned stall has been filled.

17. In a shocking attachment for grain-binders, the combination with a rotatably-mounted shaft, of a cradle fixed thereto, a spring engaging said shaft for counterbalancing the weight of said cradle, means for tilting the cradle when supporting a bundle, means for discharging said bundle from said cradle, and means for assembling the bundles discharged from the cradle.

18. In a shocking attachment for grain-binders, the combination with a frame and bundle-assembling means carried thereby, of a pivotally-mounted rod pivotally engaging said frame, a pivotally-mounted rod arranged parallel to said first-mentioned rod and also pivotally engaging said frame, a trip engaging said first-mentioned rod for supporting the same in an elevated position, and means for releasing said trip.

In testimony whereof I hereunto affix my signature in presence of two witnesses.

HERMAN WELCH.

Witnesses:
 JENNIE E. EVANS,
 JOHN T. THOMSON.